US012020662B2

(12) United States Patent
Um et al.

(10) Patent No.: US 12,020,662 B2
(45) Date of Patent: Jun. 25, 2024

(54) PIXEL CIRCUIT AND DISPLAY DEVICE

(71) Applicant: TCL CHINA STAR OPTOELECTRONICS TECHNOLOGY CO., LTD., Guangdong (CN)

(72) Inventors: Yoonsung Um, Guangdong (CN); Jing Liu, Guangdong (CN); Qi Zhang, Guangdong (CN); Kaili Qu, Guangdong (CN); Chuwei Liang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/618,484

(22) PCT Filed: Nov. 4, 2021

(86) PCT No.: PCT/CN2021/128761
§ 371 (c)(1),
(2) Date: Dec. 12, 2021

(87) PCT Pub. No.: WO2023/070720
PCT Pub. Date: May 4, 2023

(65) Prior Publication Data

US 2024/0013742 A1 Jan. 11, 2024

(30) Foreign Application Priority Data

Oct. 28, 2021 (CN) ......................... 202111263202.1

(51) Int. Cl.
*G09G 3/36* (2006.01)

(52) U.S. Cl.
CPC ... *G09G 3/3607* (2013.01); *G09G 2300/0852* (2013.01); *G09G 2310/0202* (2013.01);
(Continued)

(58) Field of Classification Search
CPC ... G09G 2300/0426; G09G 2310/0251; G09G 3/3233
See application file for complete search history.

(56) References Cited

U.S. PATENT DOCUMENTS 3,764,735 A * 10/1973 Dieter-Schneider ... H04N 23/15 348/263
6,229,508 B1 * 5/2001 Kane .................... G09G 3/3233 345/82

(Continued)

FOREIGN PATENT DOCUMENTS

CN 102566173 A 7/2012
CN 103278977 A 9/2013

(Continued)

OTHER PUBLICATIONS

Chinese Office Action issued in corresponding Chinese Patent Application No. 202111263202.1 dated Jan. 5, 2023, pp. 1-5.

(Continued)

*Primary Examiner* — Van N Chow
(74) *Attorney, Agent, or Firm* — PV IP PC; Wei Te Chung; Zhigang Ma

(57) ABSTRACT

A pixel circuit and a display device, which include a plurality of pixel driving modules, wherein each of the pixel driving modules includes a primary pixel control assembly including a primary switch and a primary pixel electrode, wherein the primary switch is configured to be controlled by a scan signal on a present-stage scan line to transfer a data signal on a data line to the primary pixel electrode; a secondary pixel control assembly including a secondary (Continued)

switch and a secondary pixel electrode, wherein the secondary switch is configured to be controlled by the scan signal on the present-stage scan line to transmit the data signal on the data line to the secondary pixel electrode; and a sharing switch configured to be controlled by a sharing scan signal on a sharing scan line to reduce the electric potential at the secondary pixel electrode.

17 Claims, 2 Drawing Sheets

(52) U.S. Cl.
CPC . *G09G 2310/08* (2013.01); *G09G 2320/0242* (2013.01); *G09G 2320/028* (2013.01); *G09G 2320/0626* (2013.01)

(56) References Cited

U.S. PATENT DOCUMENTS

| | | | |
|---|---|---|---|
| 2007/0064164 A1 | 3/2007 | Tasaka et al. | |
| 2008/0198285 A1 | 8/2008 | Hsieh et al. | |
| 2009/0244042 A1* | 10/2009 | Ohnuki | G09G 3/296 345/211 |
| 2015/0103063 A1 | 4/2015 | Ye et al. | |
| 2017/0025080 A1* | 1/2017 | Aoki | H01L 27/1225 |
| 2017/0263202 A1* | 9/2017 | Du | G11C 19/28 |
| 2019/0333463 A1* | 10/2019 | Shan | G09G 3/3659 |

FOREIGN PATENT DOCUMENTS

| | | | |
|---|---|---|---|
| CN | 104216187 | A | 12/2014 |
| CN | 104360555 | A | 2/2015 |
| CN | 104483792 | A | 4/2015 |
| CN | 107132676 | A | 9/2017 |
| CN | 107818770 | A | 3/2018 |
| CN | 110376810 | A | 10/2019 |
| CN | 111176041 | A | 5/2020 |
| JP | 2008083320 | A | 4/2008 |

OTHER PUBLICATIONS

Chinese Decision of Rejection issued in corresponding Chinese Patent Application No. 202111263202.1 dated Mar. 29, 2023, pp. 1-5.
Korean Office Action issued in corresponding Korean Patent Application No. 10-2022-7001300 dated May 30, 2023, pp. 1-6.
Chinese Office Action issued in corresponding Chinese Patent Application No. 202111263202.1 dated May 26, 2022, pp. 1-8.
International Search Report in International application No. PCT/CN2021/128761, dated Jul. 27, 2022.
Written Opinion of the International Searching Authority in International application No. PCT/CN2021/128761, dated Jul. 27, 2022.

* cited by examiner

PIXEL CIRCUIT AND DISPLAY DEVICE

FIELD OF INVENTION

The present disclosure relates to the technical field of display, and specifically to a pixel circuit and a display device.

BACKGROUND OF INVENTION

In a liquid crystal display device, in order to improve a large viewing-angle color shift effect of a vertical alignment type liquid crystal display, pixel units can be designed with low color shift (LCS). For example, each of sub-pixel units is divided into a primary pixel electrode and a secondary pixel electrode. During a display process, the primary pixel electrode and the secondary pixel electrode are first charged with the same electric potential, and then the electric potential at the secondary pixel electrode is reduced so that the electric potential at the primary pixel electrode and the secondary pixel electrode are different.

For example, a switch of the primary pixel electrode, a switch of the secondary pixel electrode, and a sharing signal switch are controlled by a same signal line, an LCS curve will show a downward trend, wherein a viewing-angle is poor when the LCS characteristic parameter is low, and penetration is bad when the LCS characteristic parameter is high. In order to improve this situation, although other technologies have been proposed, such as a control method regarding changing the sharing signal switch, an adjustable range of an LCS characteristic curve is limited, which cannot meet the requirements of viewing-angle and transmittance at the same time, and still needs to be improved.

SUMMARY OF INVENTION

The present disclosure provides a pixel circuit and a display device, which are used to improve an adjustable range of a low color shift curve in the prior art.

To solve the above-mentioned problem, a first aspect of the present disclosure provides a pixel circuit, including: a plurality of pixel driving modules, wherein each of the pixel driving modules includes: a primary pixel control assembly comprising a primary switch and a primary pixel electrode, wherein the primary switch is configured to be controlled by a scan signal on a present-stage scan line to transfer a data signal on a data line to the primary pixel electrode; a secondary pixel control assembly including a secondary switch and a secondary pixel electrode, wherein the secondary switch is configured to be controlled by the scan signal on the present-stage scan line to transmit the data signal on the data line to the secondary pixel electrode; and a sharing switch configured to be controlled by a sharing scan signal on a sharing scan line to reduce the electric potential at the secondary pixel electrode; wherein the present-stage scan line and the sharing scan line are insulated from each other; and the scan signal on the present-stage scan line is configured to have a first positive-level pulse, and the sharing scan signal on the sharing scan line is configured to have a second positive-level pulse, the second positive-level pulse is later than the first positive-level pulse, and there is an interval of time between the first positive-level pulse and the second positive-level pulse.

According to an embodiment of the present disclosure, each of the primary switch, the secondary switch, and the sharing switch is a transistor switch including a control terminal, a first terminal, and a second terminal, the control terminal of the primary switch and the control terminal of the secondary switch are electrically connected to the present-stage scan line, and the control terminal of the sharing switch is electrically connected to the sharing scan line.

According to an embodiment of the present disclosure, the first terminal of the sharing switch is electrically connected to the secondary pixel electrode and the second terminal of the secondary switch, and the second terminal of the sharing switch is electrically connected to a common electrode.

According to an embodiment of the present disclosure, each of the primary pixel electrode and the secondary pixel electrode includes a liquid crystal capacitor and a storage capacitor, the liquid crystal capacitor of the secondary pixel electrode is electrically connected to the second terminal of the secondary switch and a first common electrode, the storage capacitor of the secondary pixel electrode is electrically connected to the second terminal of the secondary switch and a second common electrode, and the second terminal of the sharing switch is electrically connected to the second common electrode.

According to an embodiment of the present disclosure, the present-stage scan line and the sharing scan line are disposed in two metal material layers, and an insulation layer is disposed between the two metal material layers.

According to an embodiment of the present disclosure, the sharing switch is configured to be turned on to reduce the electric potential at the secondary pixel electrode.

According to an embodiment of the present disclosure, the pixel driving module is configured for blue sub-pixels, configured for red sub-pixels, or configured for blue and red sub-pixels.

To solve the above-mentioned problem, a second aspect of the present disclosure provides a pixel circuit, including: a plurality of pixel driving modules, wherein each of the pixel driving modules includes: a primary pixel control assembly including a primary switch and a primary pixel electrode, wherein the primary switch is configured to be controlled by a scan signal on a present-stage scan line to transfer a data signal on a data line to the primary pixel electrode; a secondary pixel control assembly including a secondary switch and a secondary pixel electrode, wherein the secondary switch is configured to be controlled by the scan signal on the present-stage scan line to transmit the data signal on the data line to the secondary pixel electrode; and a sharing switch configured to be controlled by a sharing scan signal on a sharing scan line to reduce the electric potential at the secondary pixel electrode.

According to an embodiment of the present disclosure, each of the primary switch, the secondary switch, and the sharing switch is a transistor switch including a control terminal, a first terminal, and a second terminal, the control terminal of the primary switch and the control terminal of the secondary switch are electrically connected to the present-stage scan line, and the control terminal of the sharing switch is electrically connected to the sharing scan line.

According to an embodiment of the present disclosure, the first terminal of the sharing switch is electrically connected to the secondary pixel electrode and the second terminal of the secondary switch, and the second terminal of the sharing switch is electrically connected to a common electrode.

According to an embodiment of the present disclosure, each of the primary pixel electrode and the secondary pixel electrode includes a liquid crystal capacitor and a storage capacitor, the liquid crystal capacitor of the secondary pixel electrode is electrically connected to the second terminal of the secondary switch and a first common electrode, the storage capacitor of the secondary pixel electrode is electrically connected to the second terminal of the secondary switch and a second common electrode, and the second terminal of the sharing switch is electrically connected to the second common electrode.

According to an embodiment of the present disclosure, the present-stage scan line and the sharing scan line are insulated from each other.

According to an embodiment of the present disclosure, the present-stage scan line and the sharing scan line are disposed in two metal material layers, and an insulation layer is disposed between the two metal material layers.

According to an embodiment of the present disclosure, the sharing switch is configured to be turned on to reduce the electric potential at the secondary pixel electrode.

According to an embodiment of the present disclosure, the scan signal on the present-stage scan line is configured to have a first positive-level pulse, and the sharing scan signal on the sharing scan line is configured to have a second positive-level pulse, the second positive-level pulse is later than the first positive-level pulse, and there is an interval of time between the first positive-level pulse and the second positive-level pulse.

According to an embodiment of the present disclosure, the pixel driving module is configured for blue sub-pixels, configured for red sub-pixels, or configured for blue and red sub-pixels.

To solve the above-mentioned problem, a third aspect of the present disclosure provides a display device including the above-mentioned pixel circuit.

In the pixel circuit and the display device of the present disclosure, the primary switch is configured to be controlled by the scan signal on the present-stage scan line to transmit the data signal on the data line to the primary pixel electrode, and the secondary switch is configured to be controlled by the scan signal on the present-stage scan line to transmit the data signal on the data line to the secondary pixel electrode, and the sharing switch is configured to be controlled by the sharing scan signal on the sharing scan line to reduce the electric potential at the secondary pixel electrode. Therefore, the electric potential at the primary pixel electrode is different from the electric potential at the secondary pixel electrode, which greatly increases an adjustable range of an LCS curve, and can simultaneously meet a low grayscale viewing-angle and high grayscale penetration requirements of the display device for proper adjustment to a difference of a liquid crystal deflection angle. Meanwhile, meeting the low grayscale viewing-angle and high grayscale penetration requirements of the display device can improve the viewing-angle and improve a large viewing-angle color shift effect of the liquid crystal display device.

BRIEF DESCRIPTION OF DRAWINGS

To more clearly describe the technical solutions in the embodiments of the present disclosure, the accompanying drawings used in the description of the embodiments will be briefly introduced as follows. Obviously, the accompanying drawings in the following description are only some embodiments of the present disclosure. For those skilled in the art, other drawings can be obtained based on these drawings without creative work.

DETAILED DESCRIPTION OF PREFERRED EMBODIMENTS

Figure 1:
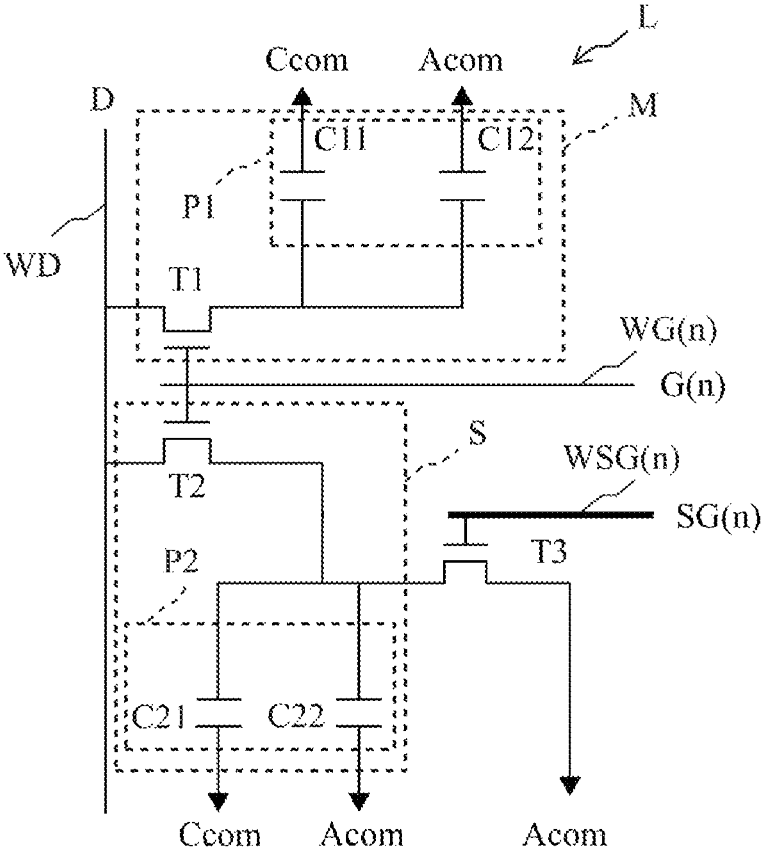
FIG. 1 is a schematic circuit diagram of a pixel circuit according to an embodiment of the present disclosure.

Technical solutions in the embodiments of the present disclosure will be clearly and completely described below in conjunction with accompanying drawings in embodiments of the present disclosure. Obviously, the described embodiments are only a part of the embodiments of the present disclosure, rather than all the embodiments. Based on the embodiments of the present disclosure, all other embodiments obtained by those skilled in the art without creative work shall fall within a protection scope of the present disclosure.

In the description herein, it should be understood that the terms such as "center," "longitudinal," "transverse," "length," "width," "thickness," "upper," "lower," "front," "back," "left," "right," "vertical," "horizontal," "top," "bottom," "inner," "outer," "clockwise," and "counterclockwise" indicating a directional or positional relationship are based on orientation or positional relationship shown in the drawings and are only for the convenience of describing the present disclosure and simplifying the description and do not indicate or imply that the device or element referred to has a specific orientation and is constructed and operated in a specific orientation, and therefore it cannot be understood as a limitation to the present disclosure.

In the description herein, it should be understood that terms "first" and "second" are only used for descriptive purposes, and cannot be understood as indicating or implying relative importance or implicitly indicating the number of indicated technical features. Therefore, features defined with "first" and "second" may explicitly or implicitly include one or more of the features. In the description of the present disclosure, "plurality" means two or more, unless otherwise specifically defined.

Many different embodiments or examples are provided herein to realize the different structures of the present disclosure. In order to simplify the disclosure of the present disclosure, components and configurations of specific examples are described below. Certainly, they are only examples, and the purpose is not limited to the present disclosure. In addition, the present disclosure may repeat reference numerals and/or reference letters in different examples, and this repetition is used for a purpose of simplification and clarity and itself does not indicate a relationship between the various embodiments and/or configurations discussed. In addition, examples of various specific processes and materials are provided herein, but those skilled in the art may be aware of applications of other processes and/or the use of other materials.

In the liquid crystal display panel, in order to improve a large viewing-angle color shift effect of a liquid crystal display device (such as a vertical alignment type), pixel units can be designed with low color shift (LCS).

For example, a first aspect of the present disclosure provides a pixel circuit that can be applied to a liquid crystal display device with a design for low color shift, such as a liquid crystal display device with a multi-domain (such as four-domain or eight-domain) structure, but is not limited to the description here.

As shown in FIG. 1, the pixel circuit includes a plurality of pixel driving modules L for driving a plurality of sub-pixels (such as red, green, and blue sub-pixels). For example, the pixel driving module L includes a primary pixel control assembly M and a secondary pixel control assembly S. For example, the pixel driving module L including the primary pixel control assembly M and the secondary pixel control assembly S can be configured for blue sub-pixels, configured for red sub-pixels, or configured for blue and red sub-pixels, to optimize the display effect, but is not limited to the description here.

As shown in FIG. 1, the primary pixel control assembly M may include a primary switch T1 and a primary pixel electrode P1. The primary switch T1 may be configured to be controlled by a scan signal G(n) of a present-stage scan line WG(n) to transfer a data signal D of a data line WD to the primary pixel electrode P1, wherein n is a positive integer that indicates a specific-stage scan configuration in a multi-stage scan architecture.

As shown in FIG. 1, the secondary pixel control assembly S may include a secondary switch T2 and a secondary pixel electrode P2. The secondary switch T2 can be configured to be controlled by the scan signal G(n) on the present-stage scan line WG(n) to transfer the data signal D of the data line WD to the secondary pixel electrode P2.

As shown in FIG. 1, the pixel driving module may further include a sharing switch T3. The sharing switch T3 may be configured to be controlled by a sharing scan signal SG(n) on a sharing scan line WSG(n) to turn down electric potential at the secondary pixel electrode P2.

The following examples illustrate embodiments of the pixel circuit, but are not limited to the description here.

For example, as shown in FIG. 1, each of the primary switch T1, the secondary switch T2, and the sharing switch T3 is a transistor switch, and the transistor switch includes a control terminal, a first terminal, and a second terminal, such as a gate, a drain, and a source of a thin film transistor (TFT), but not limited to the description here. The control terminal can be controlled by an electrical signal to control conduction between the first terminal and the second terminal so that a signal from the first terminal is transmitted to the second terminal.

As shown in FIG. 1, the control terminal of the primary switch T1 is electrically connected to the present-stage scan line WG(n), the first terminal of the primary switch T1 is electrically connected to the data line WD, and the second terminal of the primary switch T1 is electrically connected to the primary pixel electrode P1. For example, the primary pixel electrode P1 includes a liquid crystal capacitor C11 and a storage capacitor C12. The liquid crystal capacitor C11 is electrically connected between the second terminal of the primary switch T1 and a first common electrode Ccom. The storage capacitor C12 is electrically connected between the second terminal of the primary switch T1 and a second common electrode Acom.

As shown in FIG. 1, the control terminal of the secondary switch T2 is electrically connected to the present-stage scan line WG(n). The first terminal of the secondary switch T2 is electrically connected to the data line D. The second terminal of the secondary switch T2 is electrically connected to the secondary pixel electrode P2. For example, the secondary pixel electrode P2 includes a liquid crystal capacitor C21 and a storage capacitor C22. The liquid crystal capacitor C21 is electrically connected between the second terminal of the secondary switch T2 and the first common electrodes Ccom. The storage capacitor C22 is electrically connected between the second terminal of the secondary switch T2 and the second common electrode Acom.

As shown in FIG. 1, a control terminal of the sharing switch T3 is electrically connected to the sharing scan line WSG(n). A first terminal of the sharing switch T3 is electrically connected to the secondary pixel electrode P2 (for example, the liquid crystal capacitor C21 and the storage capacitor C22) and a second terminal of the secondary switch T2. A second terminal of the sharing switch T3 is electrically connected to the second common electrode Acom.

As shown in FIG. 1, during a display process, a scanning signal G(n) on the present-stage scanning line WG(n) can control the primary switch T1 and the secondary switch T2 to be turned on (ON). Meanwhile, the sharing scan signal SG(n) on the sharing scan line WSG(n) controls the sharing switch T3 to be turned off (OFF). The data signal D of the data line WD is transmitted to the primary pixel electrode P1 and the secondary pixel electrode P2, to make the primary pixel electrode P1 (such as the liquid crystal capacitor C11 and the storage capacitor C12) and the secondary pixel electrode P2 (such as the liquid crystal capacitor C21 and the storage capacitor C22) charge to the same electric potential (for example, high electric potential). Then, the scan signal G(n) on the present-stage scan line WG(n) controls the primary switch T1 and the secondary switch T2 to be turned off. Meanwhile, the sharing scan signal SG(n) on the sharing scan line WSG(n) controls the sharing switch T3 to be turned on. So, the electric potentials of the primary pixel electrode P1 and the secondary pixel electrode P2 are different. For example, the secondary pixel electrode P2 is discharged to the second common electrode Acom through the sharing switch T3 to make the electric potential at the secondary pixel electrode P2 lower than the electric potential at the primary pixel electrode P1.

Optionally, in an embodiment, as shown in FIG. 1, each of the primary switch T1, the secondary switch T2, and the sharing switch T3 is a transistor switch. The transistor switch includes a control terminal, a first terminal, and a second terminal. The control terminal of the primary switch T1 and the control terminal of the secondary switch T2 are electrically connected to the present-stage scan line WG(n), and the control terminal of the sharing switch T3 is electrically connected to the sharing scan line WSG(n). Therefore, the control terminal of the sharing switch can be controlled independently of the control terminal of the primary switch and the control terminal of the secondary switch, so as to regulate a brightness ratio between the primary pixel electrode and the secondary pixel electrode.

Optionally, in an embodiment, as shown in FIG. 1, a first terminal of the sharing switch T3 is electrically connected to the secondary pixel electrode P2 and a second terminal of the secondary switch T2. The second terminal of the sharing switch is electrically connected to a common electrode. Therefore, the secondary pixel electrode is discharged through the sharing switch, so that the electric potential at the secondary pixel electrode is lower than the electric potential at the primary pixel electrode, so as to improve the viewing-angle.

Optionally, in an embodiment, as shown in FIG. 1, each of the primary pixel electrode P1 and the secondary pixel electrode P2 includes a liquid crystal capacitor (such as C11, C21) and a storage capacitor (such as C12, C22). The liquid crystal capacitor C21 of the secondary pixel electrode P2 is electrically connected to the second terminal of the secondary switch T2 and a first common electrode Ccom. The storage capacitor C22 of the secondary pixel electrode P2 is electrically connected to the second terminal of the secondary switch T2 and a second common electrode Acom. A second terminal of the sharing switch T3 is electrically connected to the second common electrode Acom. Therefore, the secondary pixel electrode is discharged to the second common electrode through the sharing switch, so that the electric potential at the primary pixel electrode is different from the electric potential at the secondary pixel electrode, so as to appropriately adjust the difference in the deflection angle of the liquid crystal.

Optionally, in an embodiment, as shown in FIG. 1, the sharing switch T3 is configured to be turned on to reduce the electric potential at the secondary pixel electrode P2. Therefore, the electric potential at the secondary pixel electrode is lower than the electric potential at the primary pixel electrode, so that the electric potential at the primary pixel electrode is different from the electric potential at the secondary pixel electrode, and the large viewing-angle deviation phenomenon of the liquid crystal display device can be improved.

Optionally, in an embodiment, as shown in FIG. 1, the present-stage scan line WG(n) and the sharing scan line WSG(n) are insulated from each other. For example, the present-stage scan line WG(n) and the sharing scan line WSG(n) are disposed at two metal material layers, and an insulating layer is disposed between the two metal material layers to avoid mutual interference of control signals. Therefore, the scan signal on the present-stage scan line and the sharing scan signal on the sharing scan line can be independent of each other. a length of time between the sharing scan signal and the scan signal can be adjusted in a time-division manner in order to flexibly adjust the electric potential and brightness ratio of the sub-pixel electrode and the main pixel electrode.

It should be noted that the length of time that the electric potential at the secondary pixel electrode is at a high electric potential and at a low electric potential is adjustable (time division) so that low color shift (LCS) characteristic parameters (e.g., the ratio of the brightness of the secondary pixel electrode to the brightness of the primary pixel electrode) can be flexibly adjusted.

Figure 2:
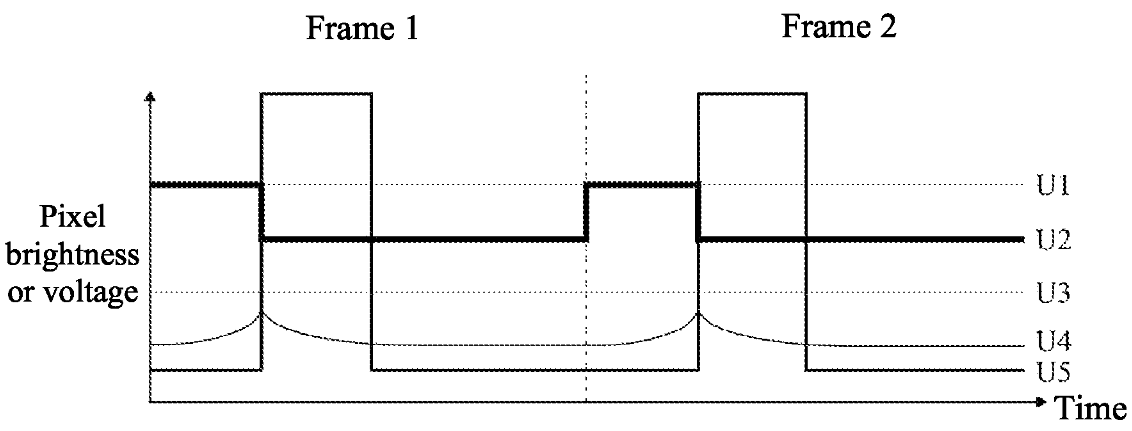
FIG. 2 is a schematic diagram of pixel brightness change in a case that a sharing switch is turned on later than a primary switch and a secondary switch for ¼ frame according to the embodiment of the present disclosure.

For example, the pixel brightness that the sharing switch is turned on ¼ frame later than the primary switch and the secondary switch is taken as an example, FIG. 2 is a schematic diagram of a pixel brightness change when the sharing switch is turned on ¼ frame later than the primary switch and the secondary switch. The pixel brightness or voltage expressed on the vertical axis is positively correlated, and time is expressed on the horizontal axis. In FIG. 2, a time length of two-frame is taken as an example, wherein U1 represents a brightness curve of the primary pixel electrode generating high grayscale when the primary switch is turned on so that the primary pixel electrode maintains a high level (for example, 14 volts); U2 represents a brightness curve of the secondary pixel electrode generating high grayscale when the secondary pixel electrode is turned on and off so that the secondary pixel electrode has a pulse with a high-level; U3 represents a brightness curve of the primary pixel electrode generating low grayscale when the primary pixel electrode is turned on so that the primary pixel electrode maintains a low level (such as 0.2 volt); U4 represents a brightness curve of the secondary pixel electrode generating low grayscale when the secondary switch is turned on and off so that the secondary pixel electrode is charged and discharged; and U5 represents a voltage curve that the sharing switch is turned on ¼ frame later than the primary switch and the secondary switch.

In FIG. 2, as shown by the curve U1, the primary pixel electrode maintains high brightness as the grayscale is high; as shown by the curve U3, the primary pixel electrode maintains low brightness as the grayscale is low.

In FIG. 2, as shown by curves U2 and U5, when the secondary switch is turned on (e.g., the high level as shown by curve U2) and the sharing switch is turned off (e.g., the low level as shown by curve U5), the secondary pixel electrode maintains high brightness as the grayscale is high (e.g., as shown by curve U2). When the secondary switch is turned off (e.g., the low level as shown by curve U2) and the sharing switch is turned on (e.g., the high level as shown by curve U5), the secondary pixel electrode maintains low brightness when the gray scale is high (e.g., as shown by the curve U2), so that the brightness of the secondary pixel electrode is different from the brightness of the primary pixel electrode.

It should be noted that after the sharing switch is turned on, a voltage of the secondary pixel electrode is reduced to produce a brightness change, but a frequency of the brightness change is consistent with a refresh frequency of the display panel, in which a brightness change frequency of a flickering picture is not like at twice the refresh frequency of the display panel. Therefore, the brightness change after the sharing switch is turned on will not cause an obvious flicker.

In FIG. 2, as shown by curves U4 and U5, after the sharing switch is turned on, in another frame (e.g., a frame 2 in FIG. 2), the secondary switch is turned on (e.g., the high level as shown by curve U2) and the sharing switch is turned off (e.g., the low level as shown by the curve U5), because the liquid crystals react slowly at the low grayscale, the brightness of the secondary pixel electrode at the low grayscale gradually increases (e.g., as shown by the curve U4). When the brightness of the secondary pixel electrode has not reached the brightness of the primary pixel electrode, the secondary switch is turned off and the sharing switch is turned on (e.g., the high level as shown by the curve U5), to cause that the secondary pixel electrode starts to discharge, and the brightness of the secondary pixel electrode at the low grayscale gradually decreases (e.g., as shown by the curve U4), resulting in that the brightness of the secondary pixel electrode at the low grayscale is lower. Thus, a characteristic parameter of the LCS of the low grayscale is lower than a characteristic parameter of the LCS of the high grayscale, so that a characteristic curve of the LCS shows an upward trend.

In FIG. 2, as shown by the curves U2, U4, and U5, after the sharing switch is turned on, the voltage of the secondary pixel electrode drops, so that the brightness of the secondary pixel electrode decreases. Because the characteristic parameter of the LCS is a ratio of the brightness of the secondary pixel electrode to the brightness of the primary pixel electrode, by adjusting the time when the sharing switch is turned on, the brightness of the secondary pixel electrode can be adjusted, and in turn, the characteristic parameter of the LCS parameter can be adjusted.

It should be noted that, as shown in FIG. 1, because the present-stage scan line WG(n) and the sharing scan line WSG(n) are insulated from each other, the scan signal G(n) of the present-stage scan line WG(n) and the sharing scan signal SG(n) on the sharing scan line WSG(n) are delivered separately, so that time for turning-on the sharing switch T3 can be independently controlled.

Figure 3:
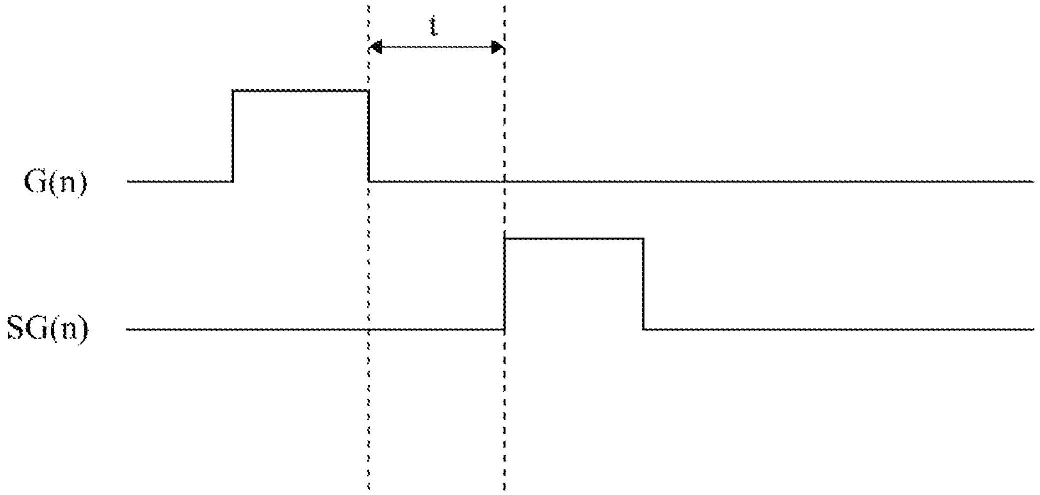
FIG. 3 is a schematic diagram of an interval of time between a scan signal and a sharing scan signal according to an embodiment of the present disclosure.

For example, as shown in FIGS. 1 and 3, after a pulse of the scan signal G(n) on the present-stage scan line WG(n)

changes from a high level to a low level, and after an interval of time t, the pulse of the sharing scan signal SG(n) on the sharing scan line WSG(n) changes from the low level to the high level, so that when the secondary pixel electrode P2 maintains the high level, after the interval of time t, the electric potential at the secondary pixel electrode P2 is controlled to be decreased. The electric potential at the secondary pixel electrode P2 is lower than the electric potential at the primary pixel electrode P1, so that the electric potential at the primary pixel electrode P1 and the electric potential at the secondary pixel electrode P2 are different, to appropriately adjust the difference of the liquid crystal deflection angle, thereby improving the viewing-angle and a large viewing-angle color shift effect of the liquid crystal display device.

Optionally, in an embodiment, as shown in FIGS. 1 and 3, the scan signal G(n) on the present-stage scan line WG(n) is configured to have a first positive-level pulse, and the sharing scan signal SG(n) on the sharing scan line WSG(n) is configured to have a second positive-level pulse. The second positive-level pulse is later than the first positive-level pulse. There is an interval of time between the first positive-level pulse and the second positive-level pulse. Therefore, by adjusting the interval of time, the electric potential and brightness ratio between the primary pixel electrode and the secondary pixel electrode can be adjusted.

In addition, a second aspect of the present disclosure provides a display device, such as a liquid crystal display device with a low color shift architecture. The display device includes the pixel circuit as described above. The implementation details of the pixel circuit can be referred to the embodiments mentioned above and will not be repeatedly described.

Figure 4:
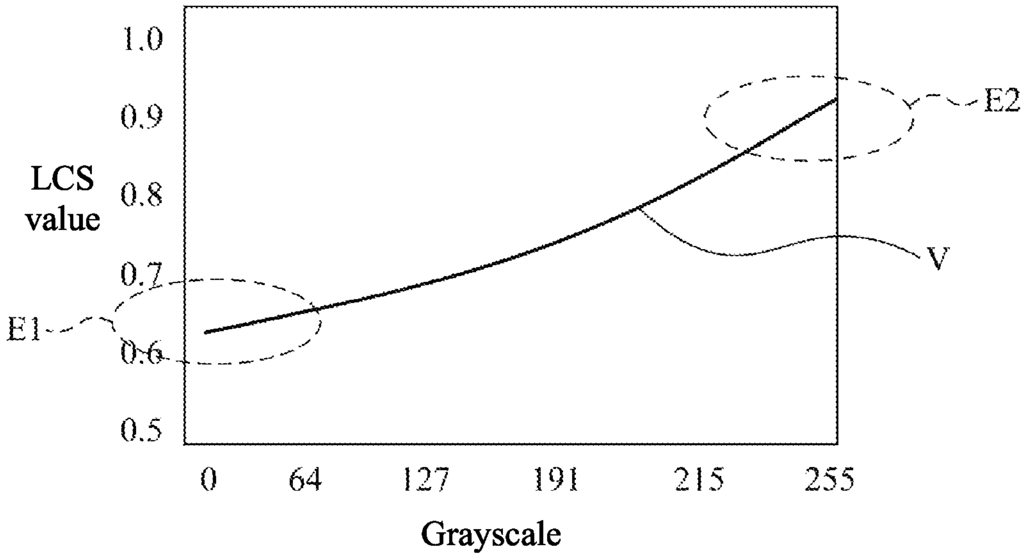
FIG. 4 is a schematic diagram of an LCS curve according to an embodiment of the present disclosure.

It should be noted that, in the pixel circuit and display device of the above-mentioned embodiments of the present disclosure, the time of turning on and off of the sharing switch is independently controlled, so that the display process of the sub-pixels has a time-division effect. As shown in FIG. 4, an adjustable range of a rising trend of an LCS curve V can be greatly increased. In a low grayscale range (as shown in a range E1), an LCS characteristic parameter is lower, and the viewing-angle effect is better; in the high grayscale range, the LCS characteristic parameter is higher (as shown in a range E2), the penetration effect is better, which can simultaneously meet the low grayscale viewing-angle and high grayscale penetration requirements of the display device. Therefore, the pixel circuit and the display device of the above-mentioned embodiments of the present disclosure can improve problems derived from a downward trend of the LCS curve or the limited adjustable range of the prior art, such as a limited viewing-angle and limited transmittance.

In the pixel circuit and the display device of the above embodiment of the present disclosure, the primary switch is configured to be controlled by the scan signal on the present-stage scan line to transmit the data signal on the data line to the primary pixel electrode, and the secondary switch is configured to be controlled by the scan signal on the present-stage scan line to transmit the data signal on the data line to the secondary pixel electrode, and the sharing switch is configured to be controlled by the sharing scan signal on the sharing scan line to reduce the electric potential at the secondary pixel electrode. Therefore, the electric potential at the primary pixel electrode is different from the electric potential at the secondary pixel electrode, in which the adjustable range of the LCS curve is greatly increased. Meanwhile, it can simultaneously meet a low grayscale viewing-angle and high grayscale penetration requirements of the display device for proper adjustment to a difference of a liquid crystal deflection angle. Meanwhile, meeting the low grayscale viewing-angle and high grayscale penetration requirements of the display device can improve the viewing-angle and improve a large viewing-angle color shift effect of the liquid crystal display device.

The embodiments of the present disclosure are described in detail above, and specific examples are used herein to illustrate the principles and implementation of the present disclosure. The descriptions of the above embodiments are only used to help understand the technical solutions and core ideas of the present disclosure. Those skilled in the art should understand that they can still modify the technical solutions recorded in the previous embodiments or equivalently replace some technical features. However, these modifications or replacements do not cause the essence of the corresponding technical solutions to deviate from the scope of the technical solutions of the embodiments of the present disclosure.

What is claimed is:

1. A pixel circuit, comprising:

a plurality of pixel driving modules, wherein each of the pixel driving modules comprises:

a primary pixel control assembly comprising a primary switch and a primary pixel electrode, wherein the primary switch is configured to be controlled by a scan signal on a present-stage scan line to transfer a data signal on a data line to the primary pixel electrode;

a secondary pixel control assembly comprising a secondary switch and a secondary pixel electrode, wherein the secondary switch is configured to be controlled by the scan signal on the present-stage scan line to transmit the data signal on the data line to the secondary pixel electrode;

a sharing switch configured to be controlled by a sharing scan signal on a sharing scan line to reduce the electric potential at the secondary pixel electrode, wherein a control terminal of the sharing switch is controllable independently of a control terminal of the primary switch and a control terminal of the secondary switch, lengths of time that the electric potential at the secondary pixel electrode is at a high electric potential and at a low electric potential are adjustable by the sharing scan signal, the sharing scan signal is configured to control a length of time of turning on and turning off of the sharing switch; and wherein the present-stage scan line and the sharing scan line are insulated from each other; and the scan signal on the scan line is configured to have a first positive-level pulse, and the sharing scan signal on the sharing scan line is configured to have a second positive-level pulse, the second positive-level pulse is later than the first positive-level pulse, and there is an interval of time between the first positive-level pulse and the second positive-level pulse.

2. The pixel circuit as claimed in claim 1, wherein each of the primary switch, the secondary switch, and the sharing switch is a transistor switch comprising a control terminal, a first terminal, and a second terminal, the control terminal of the primary switch and the control terminal of the secondary switch are electrically connected to the scan line, and the control terminal of the sharing switch is electrically connected to the sharing scan line.

3. The pixel circuit of claim 2, wherein the first terminal of the sharing switch is electrically connected to the secondary pixel electrode and the second terminal of the secondary switch, and the second terminal of the sharing switch is electrically connected to a common electrode.

4. The pixel circuit as claimed in claim 3, wherein each of the primary pixel electrode and the secondary pixel electrode comprises a liquid crystal capacitor and a storage capacitor, the liquid crystal capacitor of the secondary pixel electrode is electrically connected to the second terminal of the secondary switch and a first common electrode, the storage capacitor of the secondary pixel electrode is electrically connected to the second terminal of the secondary switch and a second common electrode, and the second terminal of the sharing switch is electrically connected to the second common electrode.

5. The pixel circuit as claimed in claim 1, wherein the present-stage scan line and the sharing scan line are disposed in two metal material layers, and an insulation layer is disposed between the two metal material layers.

6. The pixel circuit of claim 1, wherein the sharing switch is configured to be turned on to reduce the electric potential at the secondary pixel electrode.

7. The pixel circuit of claim 1, wherein the pixel driving module is configured for blue sub-pixels, configured for red sub-pixels, or configured for blue and red sub-pixels.

8. A pixel circuit, comprising:

a plurality of pixel driving modules, wherein each of the pixel driving modules comprises:

a primary pixel control assembly comprising a primary switch and a primary pixel electrode, wherein the primary switch is configured to be controlled by a scan signal on a present-stage scan line to transfer a data signal on a data line to the primary pixel electrode;

a secondary pixel control assembly comprising a secondary switch and a secondary pixel electrode, wherein the secondary switch is configured to be controlled by the scan signal on the present-stage scan line to transmit the data signal on the data line to the secondary pixel electrode; and a sharing switch configured to be controlled by a sharing scan signal on a sharing scan line to reduce the electric potential at the secondary pixel electrode, wherein a control terminal of the sharing switch is controllable independently of a control terminal of the primary switch and a control terminal of the secondary switch, lengths of time that the electric potential at the secondary pixel electrode is at a high electric potential and at a low electric potential are adjustable by the sharing scan signal, the sharing scan signal is configured to control a length of time of turning on and turning off of the sharing switch.

9. The pixel circuit as claimed in claim 8, wherein each of the primary switch, the secondary switch, and the sharing switch is a transistor switch comprising a control terminal, a first terminal, and a second terminal, the control terminal of the primary switch and the control terminal of the secondary switch are electrically connected to the scan line, and the control terminal of the sharing switch is electrically connected to the sharing scan line.

10. The pixel circuit as claimed in claim 9, wherein the first terminal of the sharing switch is electrically connected to the secondary pixel electrode and the second terminal of the secondary switch, and the second terminal of the sharing switch is electrically connected to a common electrode.

11. The pixel circuit as claimed in claim 10, wherein each of the primary pixel electrode and the secondary pixel electrode comprises a liquid crystal capacitor and a storage capacitor, the liquid crystal capacitor of the secondary pixel electrode is electrically connected to the second terminal of the secondary switch and a first common electrode, the storage capacitor of the secondary pixel electrode is electrically connected to the second terminal of the secondary switch and a second common electrode, and the second terminal of the sharing switch is electrically connected to the second common electrode.

12. The pixel circuit as claimed in claim 8, wherein the present-stage scan line and the sharing scan line are insulated from each other.

13. The pixel circuit as claimed in claim 8, wherein the present-stage scan line and the sharing scan line are disposed in two metal material layers, and an insulation layer is disposed between the two metal material layers.

14. The pixel circuit as claimed in claim 8, wherein the sharing switch is configured to be turned on to reduce the electric potential at the secondary pixel electrode.

15. The pixel circuit as claimed in claim 8, wherein the scan signal on the scan line is configured to have a first positive-level pulse, and the sharing scan signal on the sharing scan line is configured to have a second positive-level pulse, the second positive-level pulse is later than the first positive-level pulse, and there is an interval of time between the first positive-level pulse and the second positive-level pulse.

16. The pixel circuit as claimed in claim 8, wherein the pixel driving module is configured for blue sub-pixels, configured for red sub-pixels, or configured for blue and red sub-pixels.

17. A display device comprising the pixel circuit as claimed in claim 8.

* * * * *